United States Patent
Inao et al.

(10) Patent No.: US 9,862,337 B2
(45) Date of Patent: Jan. 9, 2018

(54) OUTER MEMBER, OUTER MEMBER MANUFACTURING METHOD AND WIRE HARNESS

(71) Applicant: YAZAKI CORPORATION, Tokyo (JP)

(72) Inventors: Shinichi Inao, Shizuoka (JP); Hideomi Adachi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/299,611

(22) Filed: Oct. 21, 2016

(65) Prior Publication Data

US 2017/0113635 A1    Apr. 27, 2017

(30) Foreign Application Priority Data

Oct. 23, 2015  (JP) .................................. 2015-208501

(51) Int. Cl.
*B60R 16/02*    (2006.01)
*H02G 3/04*    (2006.01)

(52) U.S. Cl.
CPC ....... *B60R 16/0215* (2013.01); *H02G 3/0462* (2013.01)

(58) Field of Classification Search
CPC .......................... B60R 16/0215; H02G 3/0462
USPC ........................................................ 174/68.3
See application file for complete search history.

(56) References Cited

U.S. PATENT DOCUMENTS

| 6,119,305 | A | * | 9/2000 | Loveall | ..................... F16L 5/10 |
| | | | | | 16/2.2 |
| 8,708,727 | B2 | * | 4/2014 | Spahi | ................... H01R 13/523 |
| | | | | | 174/152 GM |
| 2005/0257347 | A1 | | 11/2005 | Tsuchiya | |
| 2010/0270075 | A1 | | 10/2010 | Murayama | |
| 2011/0297415 | A1 | | 12/2011 | Katou et al. | |
| 2011/0315420 | A1 | | 12/2011 | Larkin | |
| 2014/0190744 | A1 | | 7/2014 | Fuzioka | |
| 2015/0121658 | A1 | | 5/2015 | Kamigaichi | |
| 2015/0294768 | A1 | | 10/2015 | Sakaki et al. | |

FOREIGN PATENT DOCUMENTS

| JP | 2007-174821 A | 7/2007 |
| JP | 2008-154350 A | 7/2008 |
| JP | 2009-171649 A | 7/2009 |
| JP | 2011-254614 A | 12/2011 |
| JP | 2012-235666 A | 11/2012 |
| JP | 2013-192381 A | 9/2013 |

* cited by examiner

*Primary Examiner* — Dhirubhai R Patel
(74) *Attorney, Agent, or Firm* — Kenealy Vaidya LLP

(57) ABSTRACT

A tubular outer member which houses and protects a conductive path, the tubular outer member includes a fixing member mounting portion in which a conductive path fixing member is to be mounted so as to fix the conductive path. The fixing member mounting portion includes a guide groove configured to guide a conductive path winding portion of the conductive path fixing member extending like a line or a belt, and a pair of lead-in/out portions. The conductive path winding portion is to be inserted to and pulled out from the pair of lead-in/out portions.

7 Claims, 6 Drawing Sheets

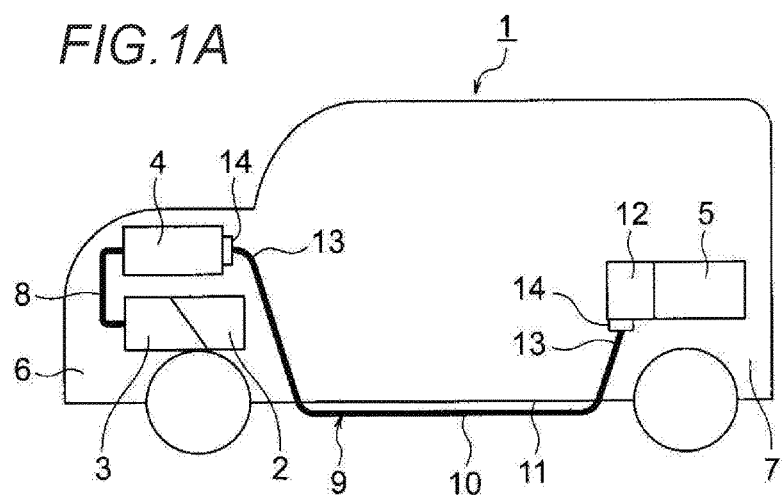
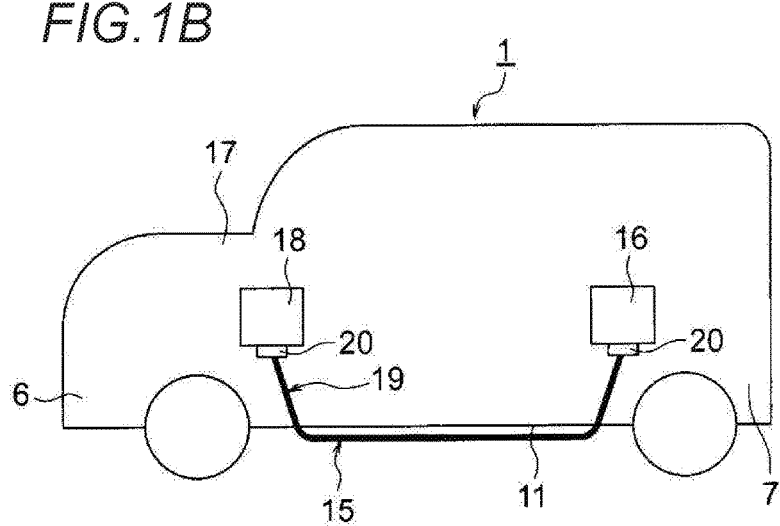

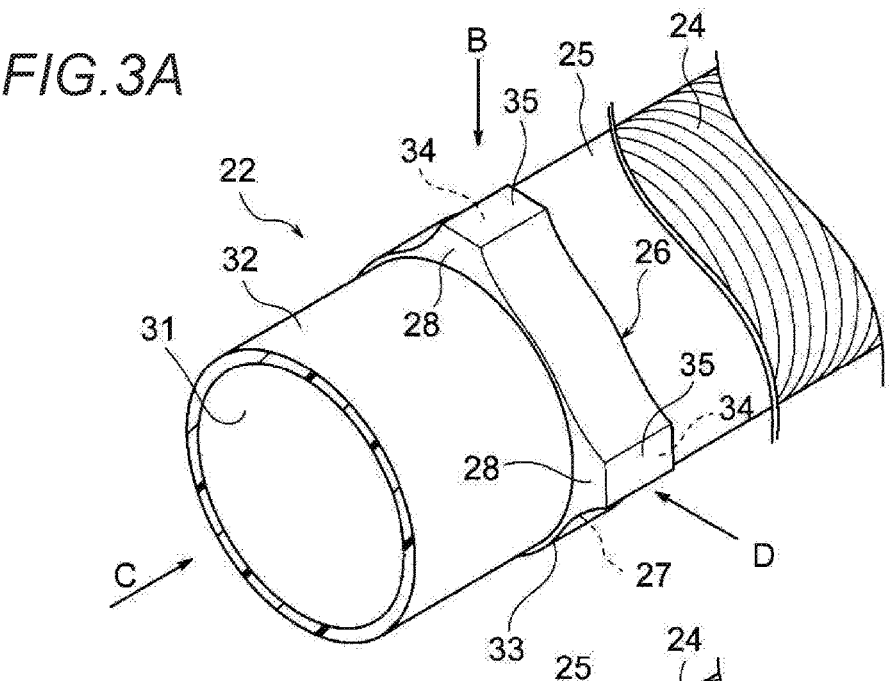
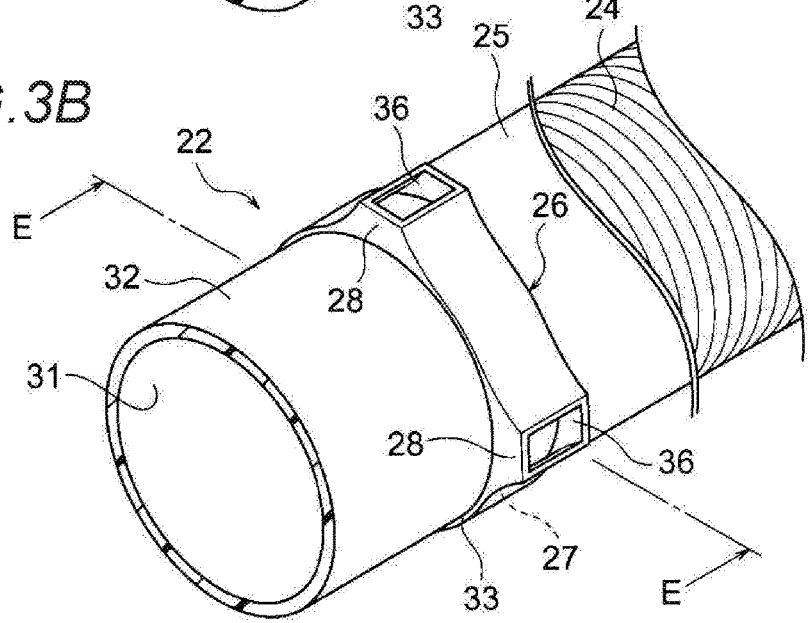

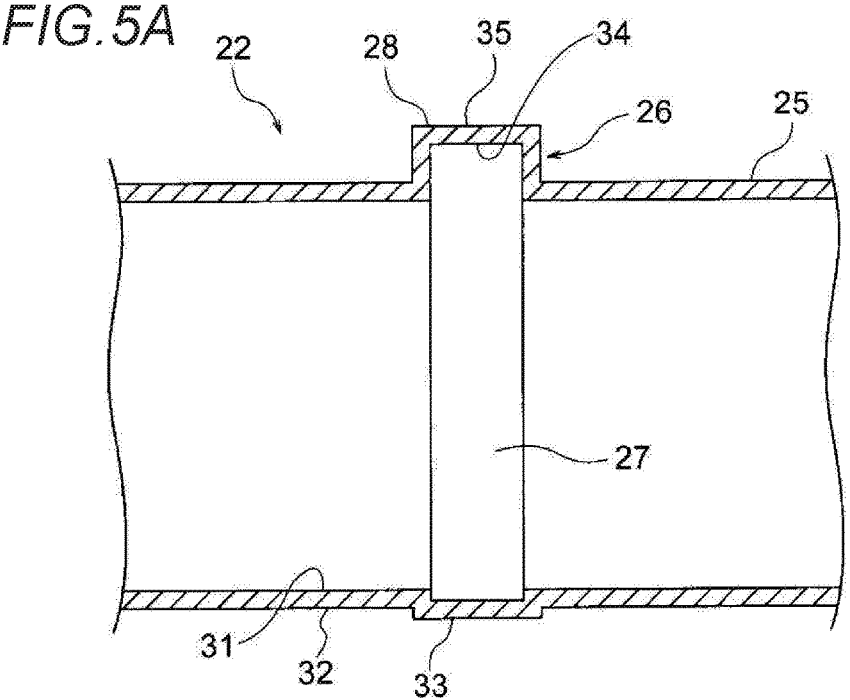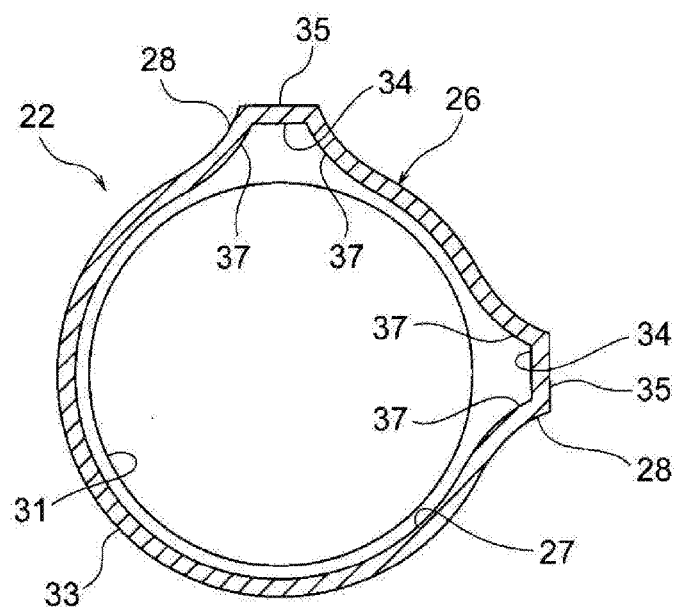

OUTER MEMBER, OUTER MEMBER MANUFACTURING METHOD AND WIRE HARNESS

CROSS REFERENCE TO RELATED APPLICATIONS

This application claims priority from Japanese Patent Application No. 2015-208501 filed on Oct. 23, 2015, the entire contents of which are incorporated herein by reference.

BACKGROUND OF THE INVENTION

Field of the Invention

The present invention relates to an outer member that houses and protects one or plural a wire harness having such a conductive path and outer member.

Description of Related Art

Wire harnesses are used for electrically connecting apparatus installed in an automobile. Wire harnesses are equipped with an outer member and one or plural conductive paths housed in the outer member. For example, Patent document 1 (:JP-A-2011-254614) discloses a wire harness which is long and is routed so that part of it runs under the floor of an automobile. The portion, running under the floor of the automobile, of the wire harness goes straightly. In the wire harness disclosed in Patent document 1, a phenomenon occurs that in its straightly routed portion the conductive path housed in the outer member shakes due to vibration etc. that occur while the automobile is running.
[Patent document 1] JP-A-2011-254614

According to a related art, when a conductive path housed in an outer member shakes widely due to vibration that occurs while an automobile is running, a covering (an outside braid or metal foil of the conductive path in the case where it has a shield function) of the conductive path may hit an inner surface of the outer member strongly and thereby be damaged.

SUMMARY

One or more embodiments provide an outer member and a wire harness capable of suppressing shaking of a conductive path.

In an aspect (1), one or more embodiments provide a tubular outer member which houses and protects a conductive path, the tubular outer member including a fixing member mounting portion in which a conductive path fixing member is to be mounted so as to fix the conductive path. The fixing member mounting portion includes a guide groove configured to guide a conductive path winding portion of the conductive path fixing member extending like a line or a belt and a pair of lead-in/out portions, wherein the conductive path winding portion is to be inserted to and pulled out from the pair of lead-in/out portions. An inner surface of the outer member is shallowly recessed at the guide groove, and the guide groove extends in a circumferential direction. The guide groove is recessed in a valley-like shape at each of the pair of lead-in/out portions when viewed from inside of the outer member, and an outer surface of the outer member is protruded in a mountain-like shape at the each of the pair of lead-in/out portions when viewed from outside of the outer member. The each of the pair of lead-in/out portions includes a lead-in/out opening which is located on an inside bottom when viewed from the inside of the outer member and an outside top when viewed from the outside of the outer member.

In an aspect (2), valley-shaped slant surface of the each of the pair of lead-in/out portions is connected with the guide groove by smooth curved surface.

In an aspect (3), one or more embodiments also provide a wire harness including a tubular outer member according to the aspect (1), the conductive path housed in and protected by the outer member, the conductive path fixing member which fixes the conductive path to the outer member. The conductive path fixing member includes the conductive path winding portion and a lock portion. The conductive path winding portion extends like the line or the belt and winds the conductive path. The lock portion maintains a winding state of the conductive path winding portion.

In an aspect (4), the lock portion includes a panel lock portion which is configured to be locked on a through-hole of a panel member of a vehicle.

According to the aspect (1), since the outer member has the above-described fixing member mounting portion, the conductive path can be fixed to the outer member by mounting the conductive path fixing member (e.g., a cable tie or a band clamp) in the fixing member mounting portion. This aspect thus provides an advantage that shaking of the conductive path in the outer member can be suppressed even during running, for example. Since shaking of the conductive path can be suppressed, this aspect provides another advantage that the covering (an outside braid or metal foil in the case where it has a shield function) of the conductive path can be prevented from being damaged.

The fixing member mounting portion of the outer member according to this aspect has the pair of lead-in/out portions and the guide groove. Since the pair of lead-in/out portions of the fixing member mounting portion are formed with the respective lead-in/out openings, the conductive path winding portion of the conductive path fixing member (e.g., a cable tie or a band clamp) can easily be caused to lead into and out of the fixing member mounting portion. In other words, the conductive path winding portion can easily be inserted into and pulled out of the thus-shaped fixing member mounting portion. When the conductive path winding portion is inserted through one lead-in/out opening, the inserted conductive path winding portion can be guided smoothly by the guide groove. And the guide groove can force the conductive path winding portion to be wound on the conductive path.

According to the aspect (2), since the valley-shaped slant surfaces of each of the pair of lead-in/out portions are connected to the guide groove by smooth curved surfaces, the conductive path winding portion of the conductive path fixing member can be inserted and pulled out smoothly through the lead-in/out openings.

According to the aspect (3), since the wire harness includes the outer member according to the aspect (1) and the conductive path fixing member such as a cable tie or a band clamp, the conductive path can be fixed to the outer member by mounting the conductive path fixing member in the fixing member mounting portion of the outer member. This aspect thus provides an advantage that shaking of the conductive path in the outer member can be suppressed even during running, for example. Since shaking of the conductive path can be suppressed, this aspect provides another advantage that the covering (an outside braid or metal foil in the case where it has a shield function) of the conductive path can be prevented from being damaged. This aspect provides a further advantage that a better wire harness can be provided.

According to the aspect (4), since the conductive path fixing member has the panel lock portion (a lock structure portion such a clip) which is to be locked on a through-hole edge portion of a panel member of a vehicle, the wire harness can be routed without using other fixing members (e.g., clamps).

BRIEF DESCRIPTION OF THE DRAWINGS

FIGS. 1A and 1B show wire harnesses according to an embodiment; FIG. 1A is a schematic diagram showing how a high-voltage wire harness is routed, and FIG. 1B is a schematic diagram showing how another wire harness, that is, a low-voltage wire harness, is routed.

FIGS. 3A and 3B are perspective views of the outer member shown in FIG. 2 before and after formation of lead-in/out openings.

FIGS. 5A and 5B are sectional views of the outer member shown in FIGS. 4A-4C taken along lines F-F and G-G, respectively.

DETAILED DESCRIPTION

Exemplary embodiments provide a wire harness which is equipped with a tubular outer member, one or plural conductive paths which are inserted in and protected by the outer member, and a conductive path fixing member for fixing the conductive path to the outer member. The outer member is formed with a guide groove for guiding a conductive path winding portion of the conductive path fixing member and a pair of lead-in/out portions for insertion and pulling-out of the conductive path winding portion. The guide groove is formed by recessing an inner surface of the outer member so as to form a shallow recess extending in the circumferential direction. The pair of lead-in/out portions are shaped so that the guide groove assumes valley-like recesses when viewed from inside, that is, an outer surface of the outer member swells out to form mountain-like portions when viewed from outside, and that lead-in/out openings appear when their portions each having an inside bottom surface and an outside top surface are cut away.

Figure 2:
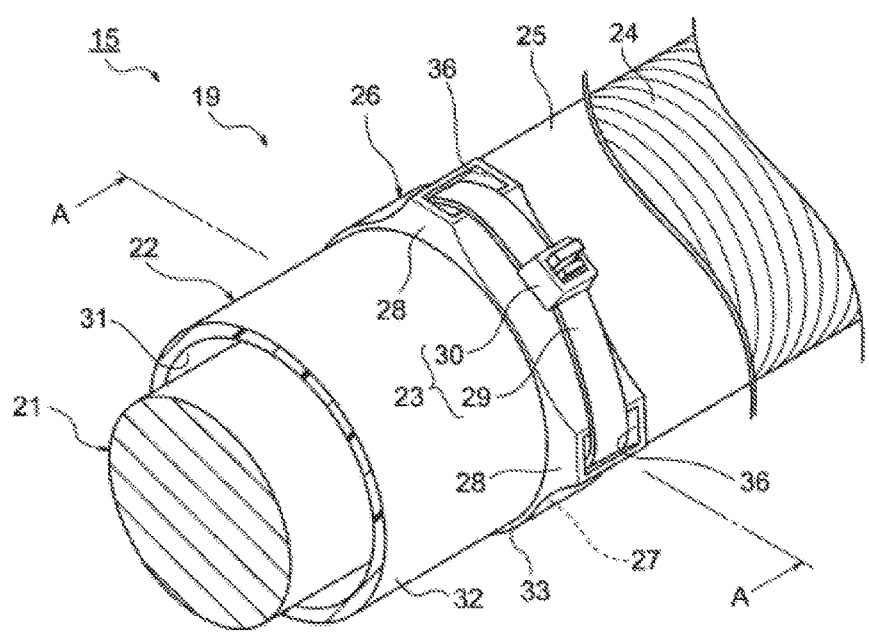
FIG. 2 is a perspective view of a wire harness and an outer member according to the embodiment.

Exemplary embodiments will be hereinafter described with reference to the drawings. FIGS. 1A and 1B show wire harnesses according to an embodiment; FIG. 1A is a schematic diagram showing how a high-voltage wire harness is routed and FIG. 1B is a schematic diagram showing how another wire harness, that is, a low-voltage wire harness, is routed. FIG. 2 is a perspective view of a wire harness and an outer member according to the embodiment.

The embodiment is applied to a wire harness that is routed in a hybrid vehicle. (The embodiment may also be applied to an electric vehicle, an ordinary automobile that runs using an engine, and the like).

<Configuration of Hybrid Vehicle 1>

As shown in FIG. 1A, a hybrid vehicle 1 is driven by mixing two kinds of motive power of an engine 2 and a motor unit 3. Electric power is supplied from a battery (battery pack) 5 to the motor unit 3 via an inverter unit 4. In the embodiment, the engine 2, the motor unit 3, and the inverter unit 4 are mounted in an engine room 6 which is located adjacent to the front wheels etc. The battery 5 is mounted in a vehicle rear part 7 where the rear wheels etc. are disposed (or may be mounted in a vehicle compartment which is located in the rear of the engine room 6).

The motor unit 3 and the inverter unit 4 are connected to each other by a high-voltage wire harness (high-voltage motor cable) 8. Likewise, the battery 5 and the inverter unit 4 are connected to each other by a high-voltage wire harness 9. An intermediate portion 10 of the wire harness 9 is routed under a vehicle floor 11 of the vehicle (vehicle body) approximately parallel with it. The vehicle floor 11, which is a known vehicle body part and is what is called a panel member, is formed with through-holes at prescribed positions. The wire harness 9 is inserted through the through-holes water-tightly.

The wire harness 9 and the battery 5 are connected to each other via a junction block 12 which is attached to the battery 5. An external connection means such as a shield connector 14 provided for a rear-end harness terminal 13 of the wire harness 9 is electrically connected to the junction block 12. The wire harness 9 is electrically connected to the inverter unit 4 via an external connection means such as another shield connector 14 provided for a front-end harness terminal 13 of the wire harness 9.

The motor unit 3 includes a motor and a generator, and the inverter unit 4 includes an inverter and a converter. The motor unit 3 is implemented as a motor assembly including a shield case. Likewise, the inverter unit 4 is implemented as an inverter assembly including a shield case. The battery 5 is of a Ni-MH type or a Li ion type and is implemented as a module. Alternatively, a storage device such as a "capacitor" can be used as the battery 5. It goes without saying that there are no particular limitations on the battery 5 as long as it can be used for the hybrid vehicle 1 (or an electric vehicle).

As shown in FIG. 1B, a wire harness 15, which is a low-voltage wire harness, is provided to electrically connect a low-voltage battery 16 disposed in the vehicle rear part 7 of the hybrid vehicle 1 to an auxiliary device 18 (device) mounted in a vehicle font part 17. Like the wire harness 9 shown in FIG. 1A, part of the wire harness 15 is routed under the vehicle floor 11 (this is just an example; it may be routed on the compartment side).

As shown in FIGS. 1A and 1B, the high-voltage wire harnesses 8 and 9 and the low-voltage wire harness 15 are routed in the hybrid vehicle 1. Although the embodiment is applicable to any of them, the following description will be made of a representative one, that is, the low-voltage wire harness 15.

<Configuration of Wire Harness 15>

As shown in FIG. 1B, the long wire harness 15, part of which is routed under the vehicle floor 11, is equipped with a harness main body 19 and connectors 20 (external connection means) provided for the two respective terminals of the harness main body 19. The wire harness 15 is also equipped with fixing members (e.g., clamps) for wiring itself along a prescribed route and water stop members (e.g., grommets; not shown). In the embodiment, the fixing members are not limited to clamps (mentioned above); they may be band clamps (described later) or a combination of clamps and band clamps.

<Configuration of Harness Main Body 19>

As shown in FIG. 2, the harness main body 19 is equipped with a conductive path 21, an outer member 22 according to the embodiment which houses and protects the conductive path 21, and cable ties 23 (conductive path fixing members) for fixing the conductive path 21 to the outer member 22. Although the wire harness 15 according to the embodiment has the one conductive path 21, it is just an example and plural conductive paths 21 may be incorporated. Furthermore, the external member 22 may be such as to house and protect the high-voltage wire harness 9, too.

The conductive path 21 of the harness main body 19 will be described first, and the outer member 22 according to the embodiment and the cable ties 23 and will be described thereafter.

<Conductive Path 21>

As shown in FIG. 2, the conductive path 21 has a conductor and an insulator which covers the conductor. The conductor is made of copper, a copper alloy, aluminum, or an aluminum alloy and is circular in cross section. The conductor may be formed by twisting element wires together or have a rod conductor structure that is rectangular or circular in cross section (e.g., a rectangular core or circular core conductor; in this case, the harness main body 19 also has a rod structure). The insulator which is made of an insulative resin material is formed on the outer circumferential surface of the conductor by extrusion molding.

The insulator is formed on the outer circumferential surface of the conductor by extrusion molding using a thermoplastic resin material. The insulator is a covering that is circular in cross section and has a prescribed thickness. The thermoplastic resin material for the insulator may be of any of various known kinds, and is selected as appropriate from various known materials, for example, polymeric materials such as a polyvinyl chloride resin, a polyethylene resin, and a polypropylene resin.

<Outer Member 22 According to Embodiment>

The outer member 22 according to the embodiment will be described below with reference to FIG. 2 to FIGS. 6A and 6B.

Figure 4A:
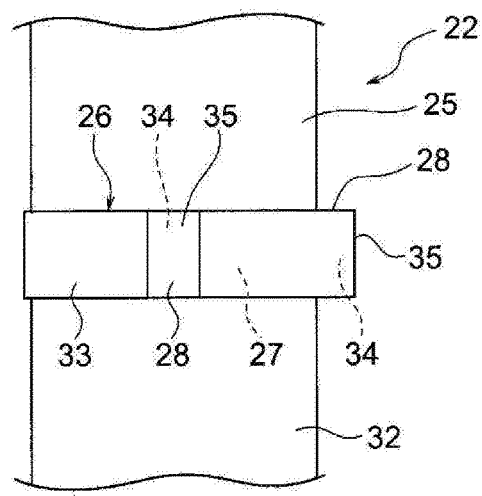
FIGS. 4A-4C are views of the outer member shown in FIG. 3A as viewed from directions indicated by arrows B, C, and D, respectively.
Figure 4B:
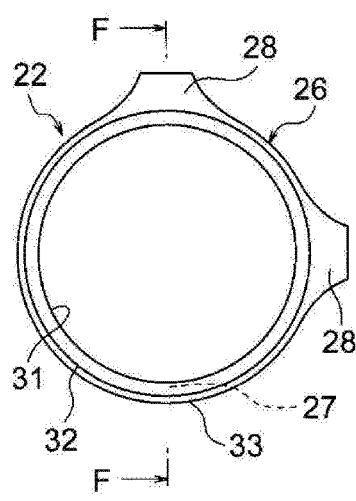
Figure 4C:
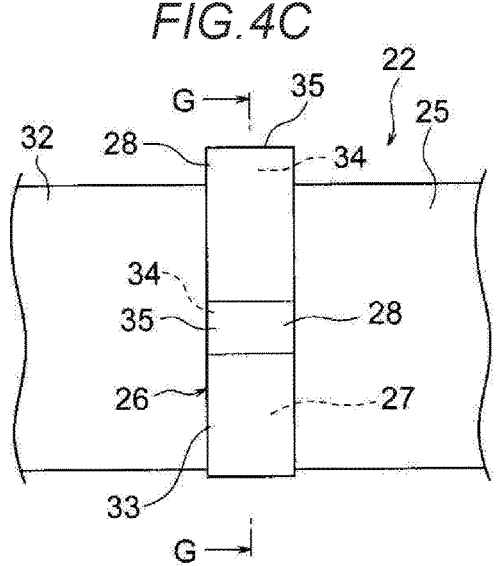
Figure 6A:
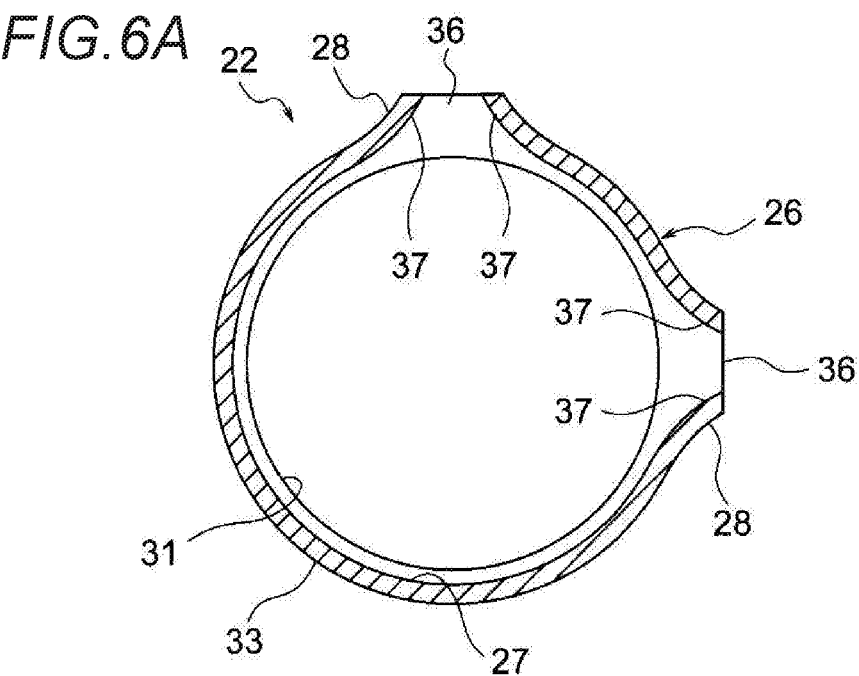
FIG. 6A is a sectional view of the outer member shown in FIG. 3B taken along line E-E.
Figure 6B:
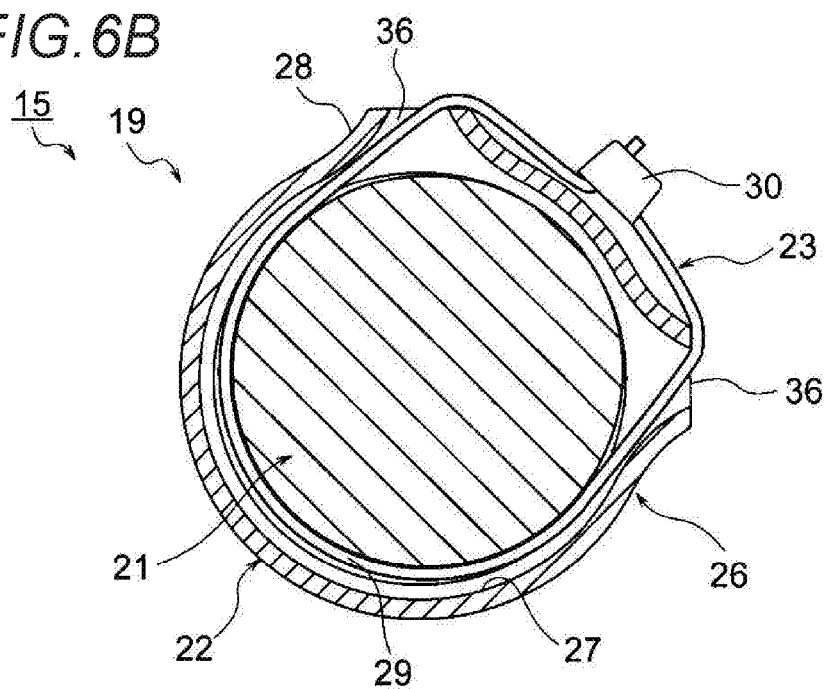
FIG. 6B is a sectional view of the wire harness shown in FIG. 2 taken along line A-A.

FIGS. 3A and 3B are perspective views of the outer member 22 shown in FIG. 2 before and after formation of lead-in/out openings 36. FIGS. 4A-4C are views of the outer member 22 shown in FIG. 3A as viewed from directions indicated by arrows B, C, and D, respectively. FIGS. 5A and 5B are sectional views of the outer member 22 shown in FIGS. 4A-4C taken along lines F-F and G-G, respectively. FIG. 6A is a sectional view of the outer member 22 shown in FIG. 3B taken along line E-E, and FIG. 6B is a sectional view of the wire harness 15 shown in FIG. 2 taken along line A-A.

As shown in FIGS. 3A and 3B to FIGS. 6A and 6B, the outer member 22 is formed by resin molding as a single, straight (before use) tubular member. (In the embodiment, the material of the outer member 22 is not limited to a resin; it may be made of a metal.) The outer member 21 is incapable of longitudinal division; in other words, it has no slit (i.e., it is not a dividable tube). The outer member 22 is circular in cross section (although in the embodiment the sectional shape of the outer member 22 is a true circle, it may be an ellipse, a rectangle, or the like).

The outer member 22 has plural flexible tube portions 24 and plural straight tube portions 25 for straight routing of the conductive path 21. The flexible tube portions 24 and straight tube portions 25 are formed alternately.

<Flexible Tube Portions 24>

The flexible tube portions 24 (see FIG. 2 and FIGS. 3A and 3B) are disposed so as to conform to shapes of attachment (fixing) target portions (wire harness routing target portions) of the vehicle body and have lengths that are not constant but suitable for the shapes of the attachment (fixing) target portions. The flexible tube portions 24 are formed so as to be able to be bent at desired angles when the wire harness 15 is packed, transported, or wired along a prescribed route in a vehicle. That is, each flexible tube portion 24 is formed so that it can not only be bent but also be returned, of course, to the original straight shape (i.e., the shape as resin-molded; see FIG. 2 and FIGS. 3A and 3B).

In the embodiment, each flexible tube portion 24 is formed like a bellows tube (the shape of each flexible tube portion 24 is not limited to any particular shape as long as it is flexible). More specifically, each flexible tube portion 24 has circumferential bellows recesses and bellows projections which are arranged continuously and alternately in the tube axial direction.

<Straight Tube Portion 25>

The straight tube portions 25 (see FIG. 2 to FIGS. 4A and 4B) are portions which are not flexible unlike the flexible tube portions 24. The straight tube portions 25 are formed as portions that are not bent when the wire harness 15 is packed, transported, or wired along a prescribed route in a vehicle (the term "are not bent" means that the straight tube portions 25 are not given flexibility in a positive sense). The straight tube portion 25 shown in FIG. 2 to FIGS. 4A and 4B is shaped like a long straight tube.

The straight tube portions 25 are more rigid than the flexible tube portions 24. The straight tube portions 24 are formed at such positions and have such lengths as to be suitable for shapes of attachment (fixing) target portions of the vehicle body. In the embodiment, the straight tube portions 25 are formed as portions to be disposed at least under the vehicle floor 11 (see FIG. 1B). Each straight tube portion 25 is integrally formed with plural band mounting portions 26 (fixing member mounting portions) which are an important feature of the embodiment.

<Plural Band Mounting Portions 26 which are an Important Feature of Exemplary Embodimens>

As shown in FIG. 2 to FIGS. 6A and 6B, the plural band mounting portions 26 are formed as portions in which cable ties 23 are to be mounted and are arranged at a prescribed pitch in the tube axial direction. Each band mounting portion 26 is formed with a guide groove 27 and a pair of lead-in/out portions 28.

<Cable Tie 23>

Before detailed description of the band mounting portion 26, the cable tie 23 (see FIG. 2 and FIGS. 6A and 6B) will be described. The cable tie 23 is composed of a band portion 29 (conductive path winding portion) and a lock portion 30 which is continuous with a base portion of the band portion 29. The band portion 29 is formed with a number of lock grooves. The lock portion 30 is formed with lock nails on which some of the lock grooves are to be hooked. The cable tie 23 is used in such a manner that a tip portion of the band portion 29 is inserted into the lock portion 30 and then the diameter of the ring formed by the band portion 29 is decreased.

As seen from the above description, the cable tie 23 is a known one, for example. Although the embodiment employs the cable tie 23, another example is possible in which the band portion 29 is shaped like a belt and the lock portion 30 is integral with a panel lock portion (e.g., a known clip-shaped portion to be locked on a through-hole edge portion of a panel member of the vehicle); a specific example is what is called a band clip.

<Guide Groove 27 of Band Mounting Portion 26>

As shown in FIGS. 5A and 5B, the guide groove 27 is formed by recessing an inner surface 31 of the outer member 22 so as to form a shallow recess. The guide groove 27 has a constant width and extends in the circumferential direction. The guide groove 27 serves to guide the band portion 29 of a cable tie 23. For this guidance purpose, the guide groove 27 is formed with a smooth bottom surface.

In the embodiment, the band mounting portion 26 is formed so that a corresponding portion of an outer surface 32 of the outer member 22 projects outward (a ring-shaped projection 33 is formed) by a length corresponding to the depth of the guide groove 27. The band mounting portion 26 is shaped so that the outer member 22 is not reduced in thickness there and is given necessary and sufficient stiffness (a slight thickness reduction causes no problem).

<Pair of Lead-in/Out Portions 28>

As shown in FIG. 2 to FIGS. 6A and 6B, the pair of lead-in/out portions 28 are portions for insertion and pulling-out of the band portion 29 of a cable tie 23. The pair of lead-in/out portions 28 have the same shape and hence a cable tie 23 can be inserted into and pulled out of the outer member 22 through either of them. The pair of lead-in/out portions 28 are formed so as to have a prescribed interval. In the embodiment, the pair of lead-in/out portions 28 are formed at such positions as to allow the band portion 29 to make a U-turn.

The pair of lead-in/out portions 28 are shaped so that the guide groove 27 assumes valley-like recesses when viewed from inside. In other words, the pair of lead-in/out portions 28 are shaped so that the outer surface 32 swells out to form mountain-like portions when viewed from outside. Furthermore, each lead-in/out portion 28 is shaped so that a lead-in/out opening 36 appears when its portion having an inside bottom surface 34 and an outside top surface 35 are cut away.

One of the pair of lead-in/out openings 36 serves as a lead-in portion (insertion portion) for the band portion 29 of a cable tie 23, and the other serves as a lead-out (pull-out portion) of the band portion 29 guided by the guide groove 27. Valley-shaped slant surfaces 37 of each lead-in/out portion 28 are connected to the guide groove 27 by smooth curved surfaces.

<Manufacturing Method of Wire Harness 15>

With the above-described configuration and structures, the conductive path 21 is fixed to the outer member 22 (see FIGS. 2 and 6B) by mounting cable ties 23 in the respective band mounting portions 26 of the outer member 22, inserting the conductive path 21 through the outer member 22 from its one end opening to the other, and then decreasing the ring diameters of the band portions 29 of the cable ties 23. Alternatively, the conductive path 21 is fixed to the outer member 22 (see FIGS. 2 and 6B) by inserting the conductive path 21 through the outer member 22 from its one end opening to the other, mounting cable ties 23 in the band mounting portions 26 of the outer member 22, and then decreasing the ring diameters of the band portions 29 of the cable ties 23.

As described above with reference to FIGS. 1A and 1B to FIGS. 6A and 6B, the harness main body 19 of the wire harness 15 is equipped with the tubular outer member 22, the conductive path 21 which is inserted in and protected by the outer member 22, and the cable bands 23 for fixing the conductive path 21 to the outer member 22. The outer member 22 has the band mounting portions 26 each of which is formed with the guide groove 27 for guiding the band portion 29 of a cable tie 23 and the pair of lead-in/out portions 28 for insertion and pulling-out of the band portion 29. The guide groove 27 is formed by recessing the inner surface 31 of the outer member 22 so as to form a shallow recess extending in the circumferential direction. The pair of lead-in/out portions 28 are shaped so that the guide groove 27 assumes valley-like recesses when viewed from inside, that is, the outer surface 32 of the outer member 22 swells out to form mountain-like portions when viewed from outside, and that the lead-in/out openings 36 appear when their portions each having an inside bottom surface 34 and an outside top surface 35 are cut away. Since the outer member 22 has the above-described band mounting portions 26, the conductive path 21 can be fixed to the outer member 22 by mounting cable ties 23 in the respective band mounting portions 26.

As is understood from the above description, the outer member 22 and the wire harness 15 according to the embodiment provide an advantage that shaking of the conductive path 22 in the outer member 22 can be suppressed even during running. Capable of suppressing shaking of the conductive path 22, the outer member 22 and the wire harness 15 according to the embodiment provide an advantage that the covering (an outside braid or metal foil in the case where it has a shield function) of the conductive path 21 can be prevented from being damaged.

It goes without saying that various modifications are possible without departing from the spirit and scope of the invention.

DESCRIPTION OF REFERENCE NUMERALS AND SIGNS

1 . . . Hybrid vehicle;
2 . . . Engine;
3 . . . Motor unit;
4 . . . Inverter unit;
5 . . . Battery;
6 . . . Engine room;
7 . . . Vehicle rear part;
8, 9 . . . Wire harness;
10 . . . Intermediate portion;
11 . . . Vehicle floor;
12 . . . Junction block;
13 . . . Harness terminal;
14 . . . Shield connector;
15 . . . Wire harness;
16 . . . Low-voltage battery;
17 . . . Vehicle rear part;
18 . . . Auxiliary device;
19 . . . Harness main body;
20 . . . Connector;
21 . . . Conductive path;
22 . . . Outer member;
23 . . . Cable tie (conductive path fixing member);
24 . . . Flexible tube portion;
25 . . . Straight tube portion;
26 . . . Band mounting portion (fixing member mounting portion);
27 . . . Guide groove;
28 . . . Lead-in/out portion;
29 . . . Band portion (conductive path winding portion);
30 . . . Lock portion;
31 . . . Inner surface;
32 . . . Outer surface;

33 . . . Ring-shaped projection;
34 . . . Bottom surface;
35 . . . Top surface;
36 . . . Lead-in/out opening;
37 . . . Valley-shaped slant surface

What is claimed is:

1. A tubular outer member which houses and protects a conductive path, the tubular outer member comprising:
    a fixing member mounting portion in which a conductive path fixing member is to be mounted so as to fix the conductive path;
    wherein the fixing member mounting portion comprises:
        a guide groove configured to guide a conductive path winding portion of the conductive path fixing member extending like a line or a belt; and,
        a pair of lead-in/out portions, wherein the conductive path winding portion is to be inserted to and pulled out from the pair of lead-in/out portions,
    wherein an inner surface of the outer member is shallowly recessed at the guide groove, and the guide groove extends in a circumferential direction,
    wherein the guide groove is recessed in a valley-like shape at each of the pair of lead-in/out portions when viewed from inside of the outer member, and an outer surface of the outer member is protruded in a mountain-like shape at the each of the pair of lead-in/out portions when viewed from outside of the outer member, and
    wherein the each of the pair of lead-in/out portions includes a lead-in/out opening for the conductive path winding portion, which is located on an inside bottom of the lead in/out portion when viewed from the inside of the outer member and an outside top of the lead in/out portion when viewed from the outside of the outer member.

2. The tubular outer member according to claim 1, wherein valley-shaped slant surfaces of the each of the pair of lead-in/out portions are connected with the guide groove by smooth curved surfaces.

3. A wire harness comprising:
the tubular outer member according to claim 1;
the conductive path housed in and protected by the outer member; and,
the conductive path fixing member which fixes the conductive path to the outer member,
wherein the conductive path fixing member includes the conductive path winding portion and a lock portion,
wherein the conductive path winding portion extends like the line or the belt and winds the conductive path, and
wherein the lock portion maintains a winding state of the conductive path winding portion.

4. The wire harness according to claim 3,
wherein the lock portion includes a panel lock portion which is configured to be locked on a through-hole of a panel member of a vehicle.

5. The tubular outer member according to claim 1,
wherein the pair of lead-in/out portions are protruded from the outer surface of the outer member.

6. A manufacturing method for a tubular outer member which houses and protects a conductive path, the manufacturing method comprising:
    forming a fixing member mounting portion in which a conductive path fixing member is to be mounted so as to fix the conductive path;
    forming a guide groove configured to guide a conductive path winding portion extending like a line or a belt in the conductive path fixing member;
    forming a pair of lead-in/out portions, wherein the conductive path winding portion is to be inserted to and pulled out from the pair of lead-in/out portions;
    forming the guide groove by making a part of an inner surface of the outer member shallowly recessed and extended in a circumferential direction;
    forming each of the pair of lead-in/out portions by making the guide groove recessed in a valley-like shape when viewed from inside and making an outer surface of the outer member protruded in a mountain-like shape when viewed from outside; and
    cutting away a part of the each of the pair of lead-in/out portions which is located on an inside bottom and an outside top so as to form a lead-in/out opening.

7. The manufacturing method according to claim 6,
connecting valley-shaped slant surfaces of the each of the pair of lead-in/out portions with the guide groove by smooth curved surfaces.

* * * * *